Jan. 31, 1956 C. L. KNOTT 2,732,554
AUTOMATIC FASTENER DRIVING DEVICES
Filed March 26, 1954 7 Sheets-Sheet 4
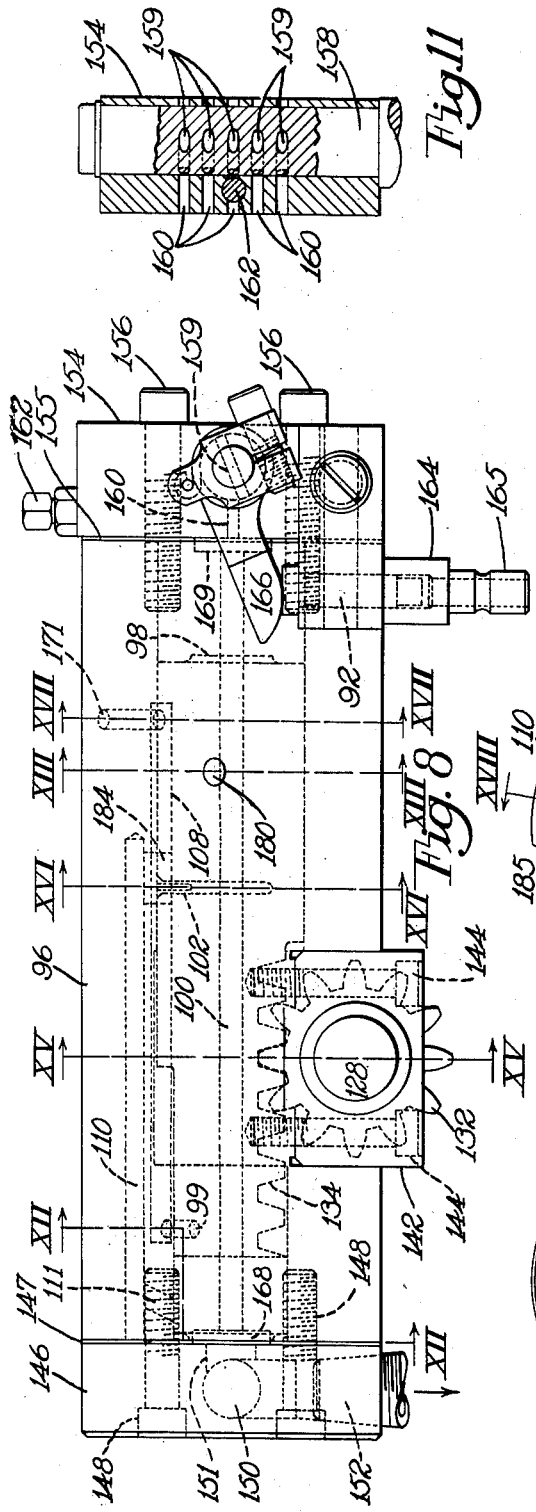
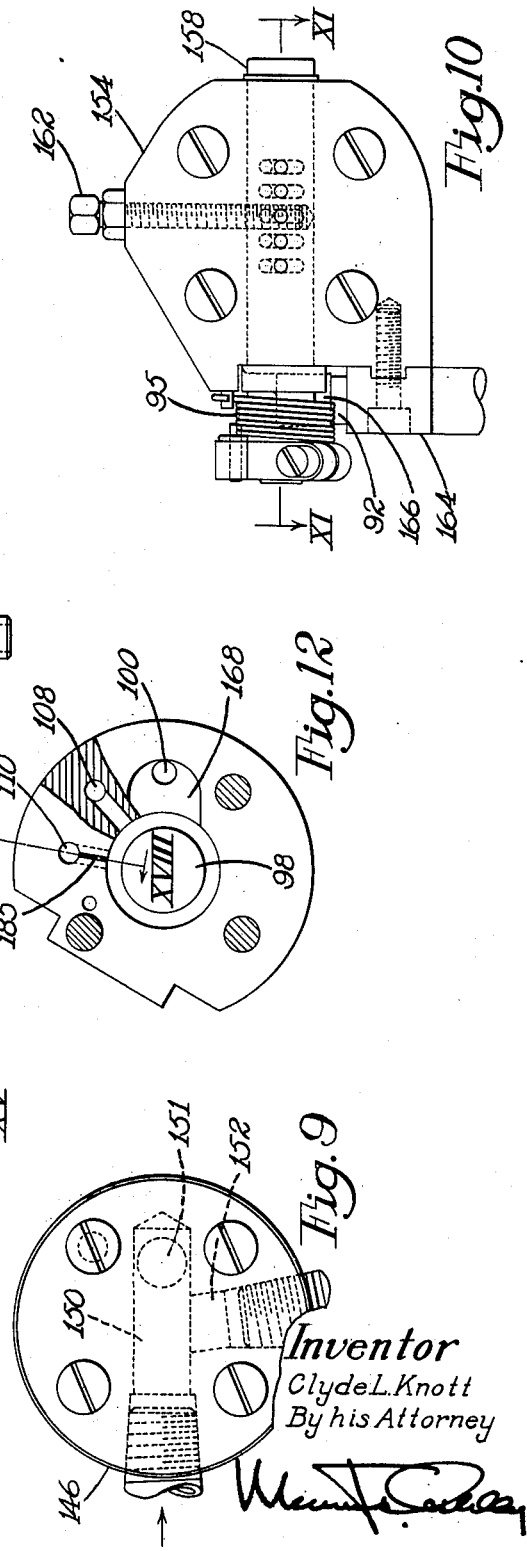
Inventor
Clyde L. Knott
By his Attorney

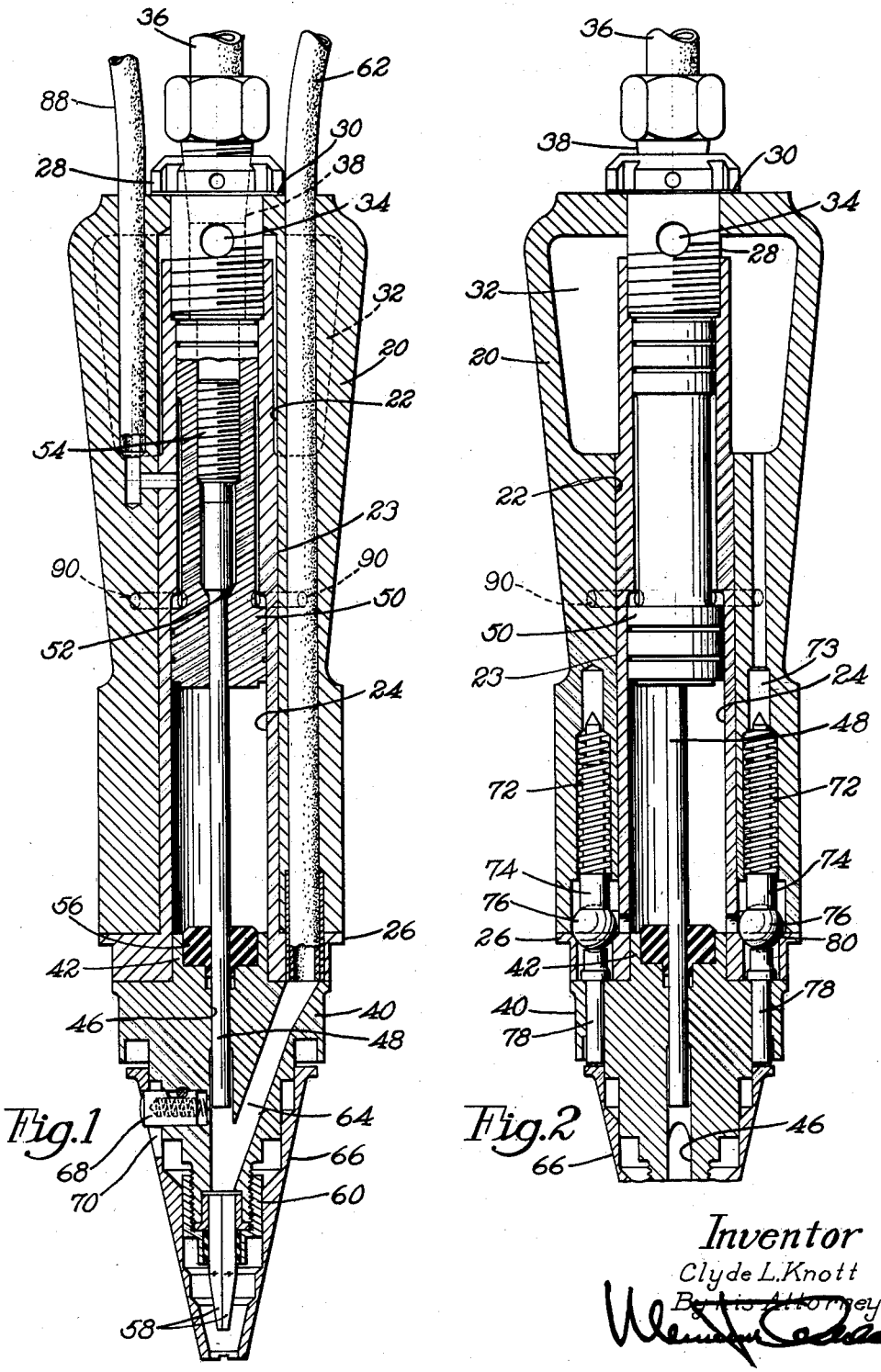

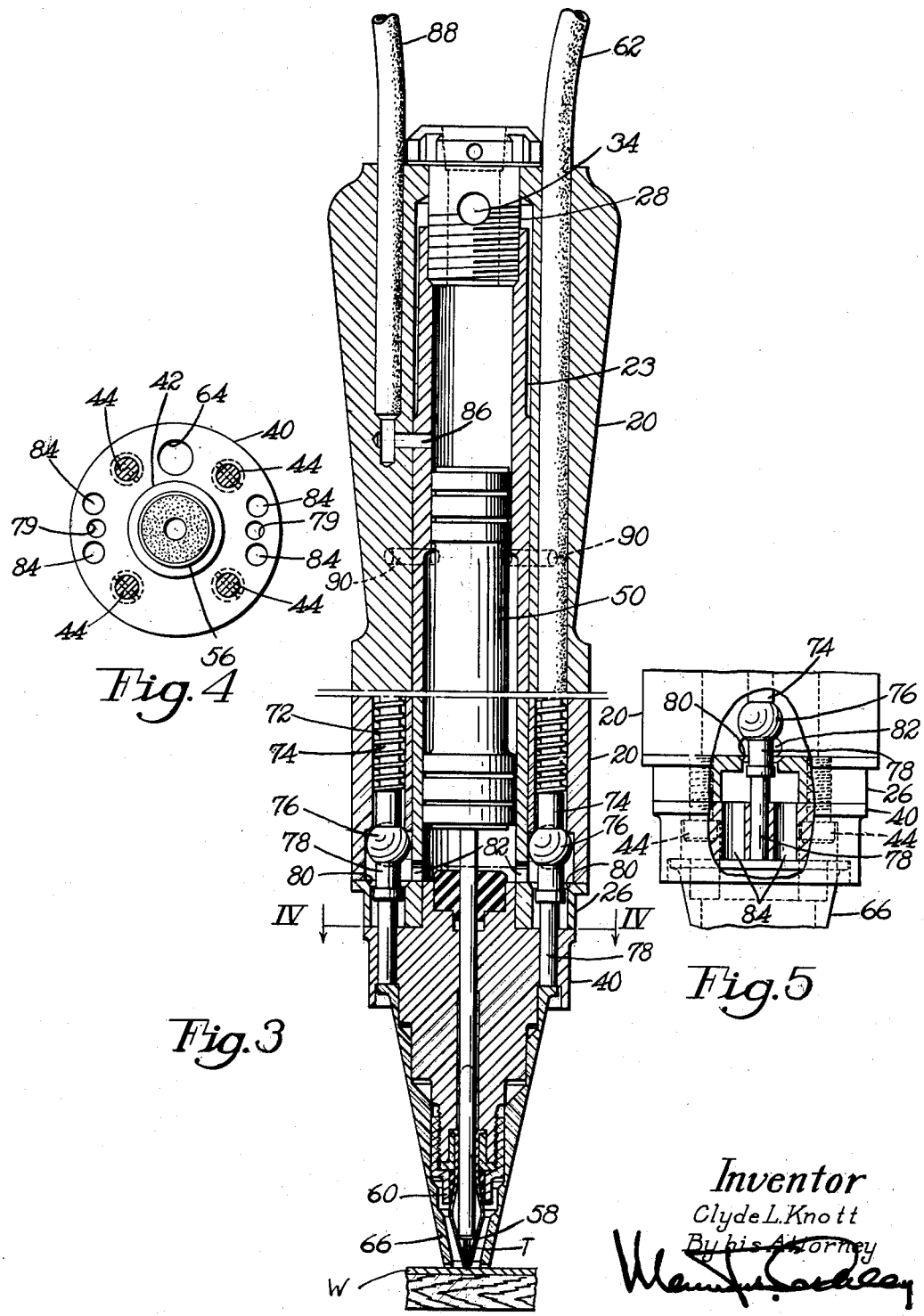

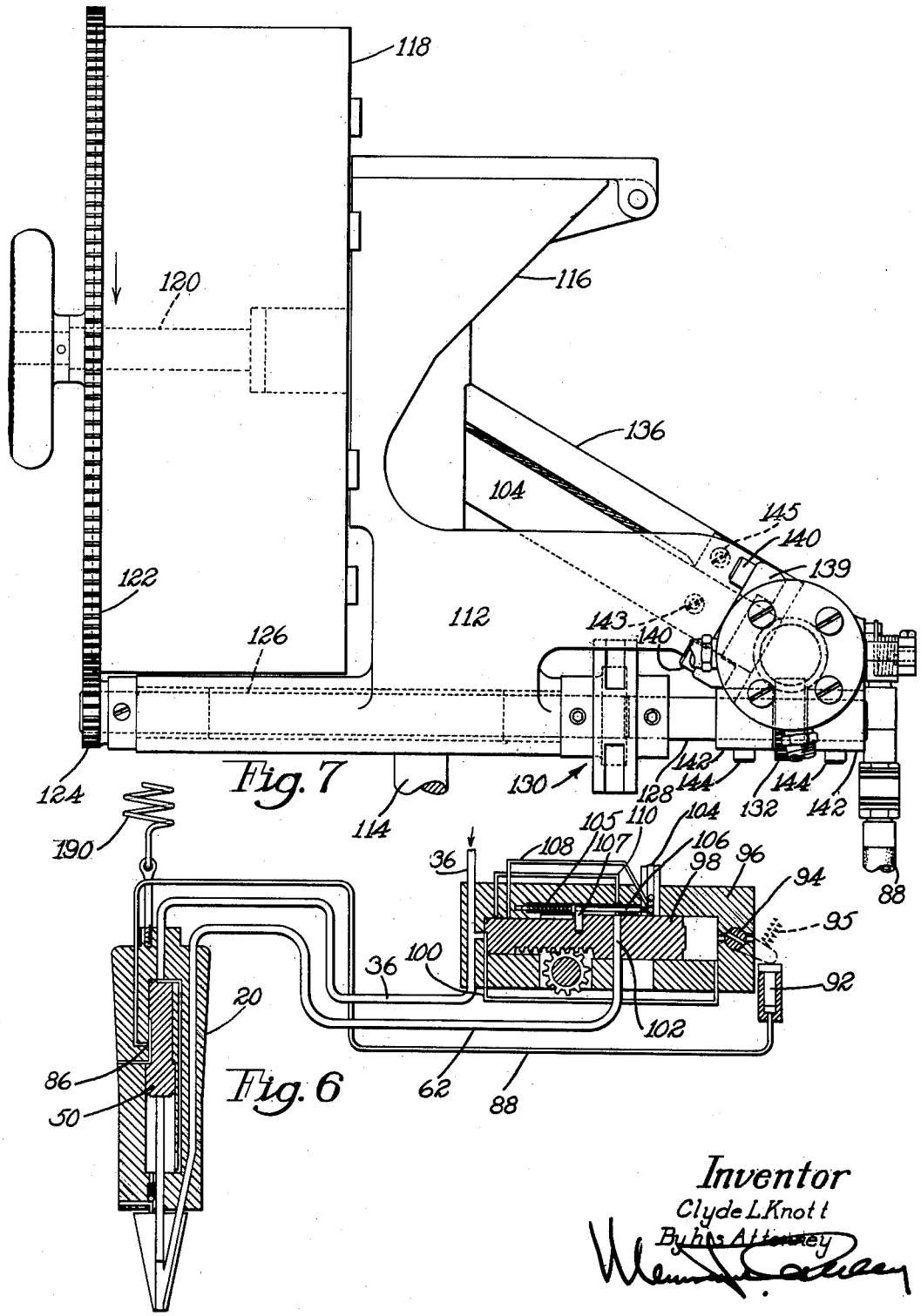

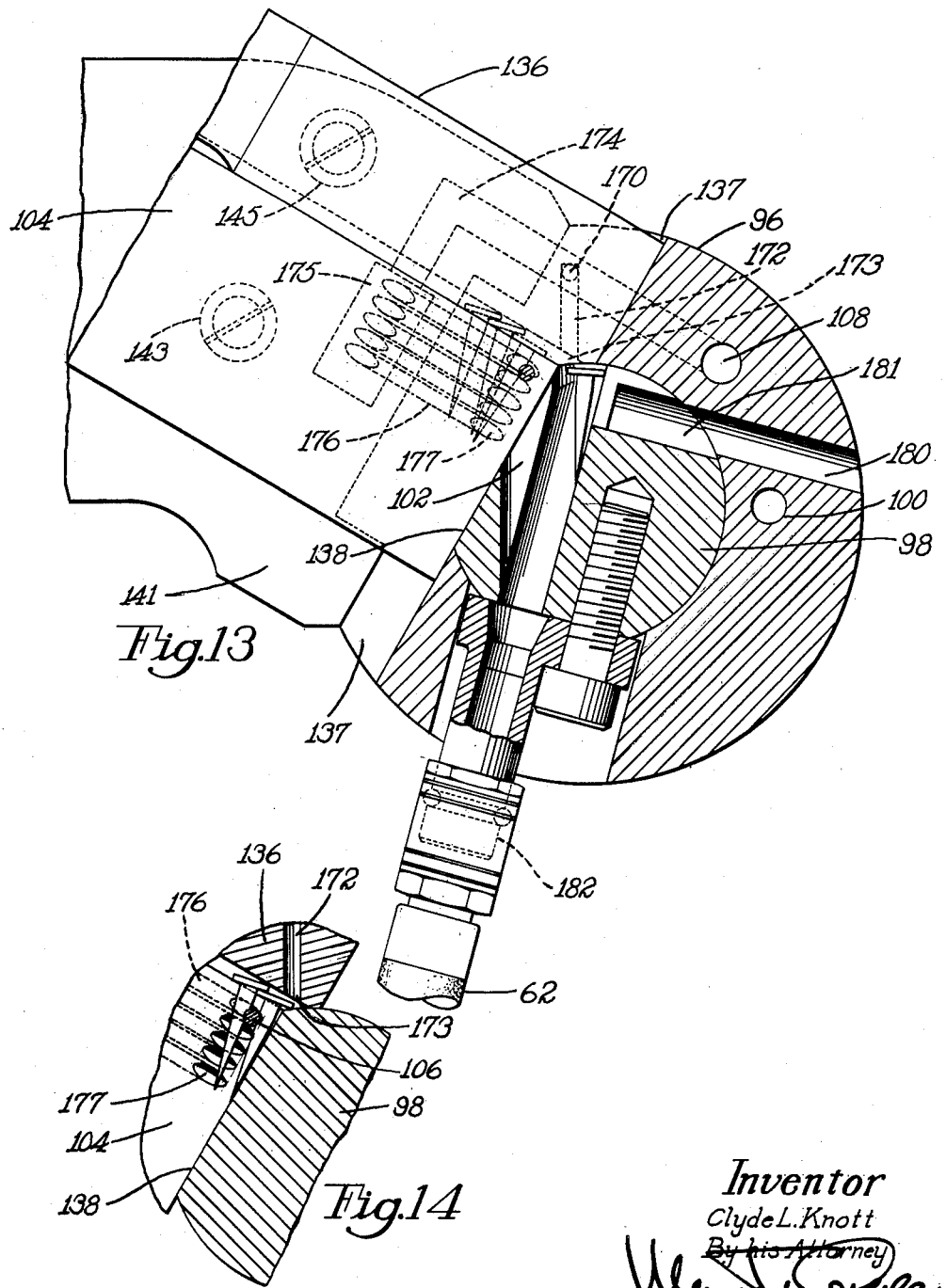

Jan. 31, 1956

C. L. KNOTT 2,732,554

AUTOMATIC FASTENER DRIVING DEVICES

Filed March 26, 1954

Inventor
Clyde L. Knott
By his Attorney

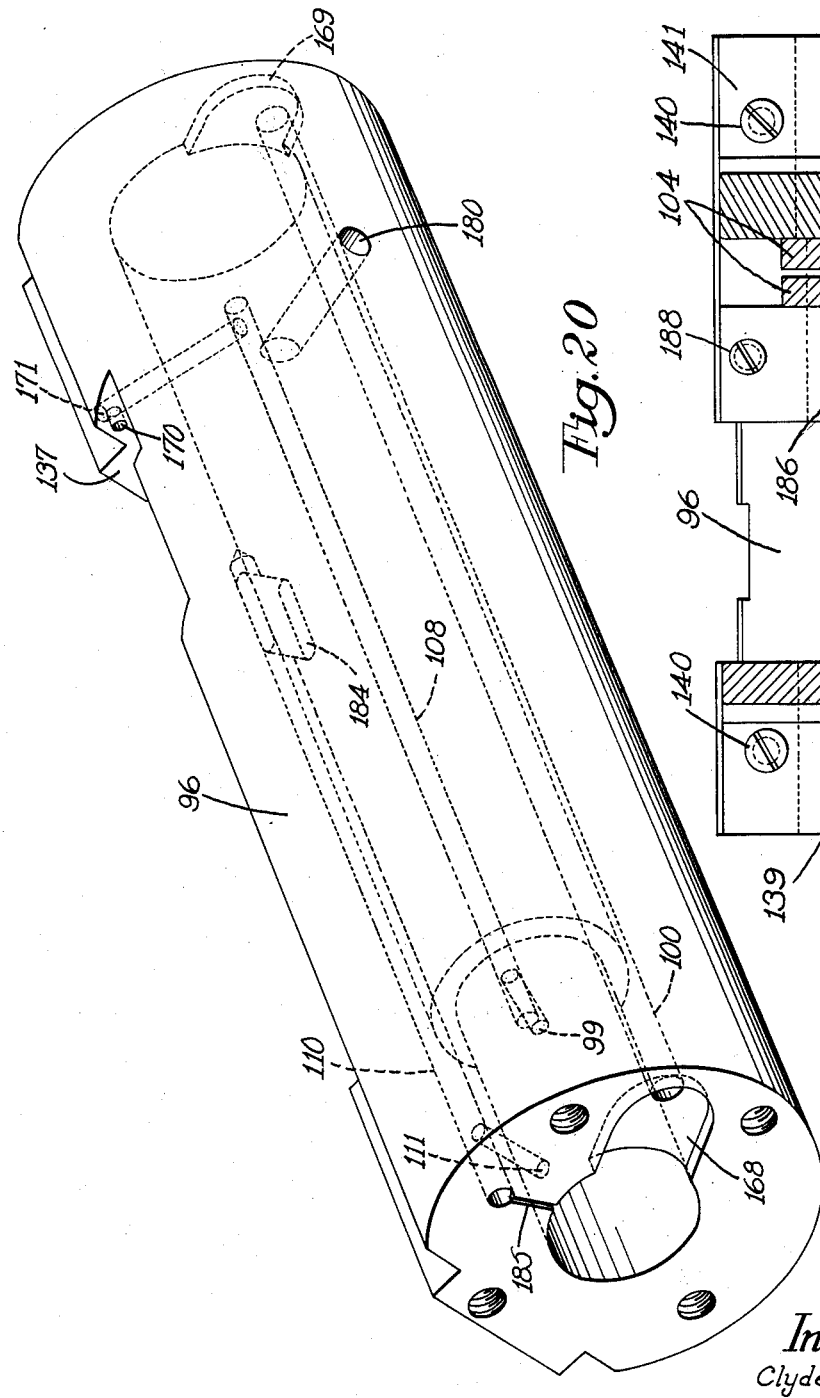

United States Patent Office 2,732,554
Patented Jan. 31, 1956

2,732,554

AUTOMATIC FASTENER DRIVING DEVICES

Clyde L. Knott, Beverly, Mass., assignor to United Shoe Machinery Corporation, Flemington, N. J., a corporation of New Jersey Application March 26, 1954, Serial No. 418,809

19 Claims. (Cl. 1—18)

This invention relates to pneumatically actuated fastener inserting devices, and particularly to automatic apparatus for feeding and driving fasteners, such as tacks, nails or screws, in rapid succession into a work piece. Although the herein illustrated embodiment of the invention is shown as a device adapted for inserting tack fasteners, it will be understood, of course, that this invention is of broader utility and, therefore, not restricted to use with any one type of fasteners.

According to the invention as herein illustrated, the device comprises a portable hand-held gun assembly for driving tacks into a work piece, and a tack feeding and separating assembly located at some convenient, fixed position remote from the gun assembly. Both assemblies are entirely pneumatically actuated and are operatively connected together by three flexible tubes or conduits. One tube supplies fluid power to both assemblies for the purpose of actuating their respective operating mechanisms, including the driving piston of the gun which is manually activated by pressing a yieldable nose thimble on the gun into operative position against the work piece. A second tube, leading from the portable gun to the fixed assembly, is a part of the automatic tack signaling mechanism and this tube serves as a conduit for pneumatic pressure variations which are occasioned by the movement of the driving piston between its inoperative and operative positions. The pressure variations introduced into the tack signaling mechanism control the actuation of a tack separating and delivery mechanism in time relation to the operation of the gun in a manner such that during the driving stroke of the gun piston an increase of pressure in the signaling system activates the tack separating mechanism to separate the next-to-be-driven tack from the rest of the tacks in a tack supply raceway and to place the separated tack in axial alinement with the third flexible tube which serves pneumatically to deliver the tack to the gun. Upon the return stroke of the driving piston, the pressure in the signaling mechanism is reduced by venting at the gun end of the signal tube, thus initiating the operation of the tack delivery mechanism which moves with the tack and tack delivery tube so as to bring the tack and delivery tube in line with an air blast directed upon the head of the tack and through the tube to the gun, whereby the tack is pneumatically delivered point first to the tack receptacle of the gun preparatory to the next driving operation of the gun.

The tack feeding and separating assembly is provided with a tack pot, the capacity of which is sufficient to supply tacks to the separator and gun over a prolonged period of continuous rapid operation. This tack pot has a rotary motion which elevates the suply of tacks so that the tacks may fall onto a raceway leading to the separator mechanism. The pot is driven through a gear and clutch connection with the separator mechanism, so that a driving impulse is imparted to the pot each time a tack is separated.

The novel construction and arrangement of the device of this invention is such as to enable an almost unlimited succession of tacks to be completely driven into hard wood, such as rock maple, at a tremendous rate of speed. The coordinated actuation of the operating mechanisms in this device is so fast that the number of tacks which can be driven during any interval of time is limited only by the speed at which a well-trained operator can manually lift the gun assembly and press it down again upon the work piece at another fastening receiving location. In actual tests it has been ascertained that, at best, an experienced operator can manually activate the gun at the rate of six driving cycles per second, whereas in engineering tests, employing mechanical activating means, the device was operated at speeds up to nine tacks per second.

The industrial fields in which this portable hand-held tacker can be employed to great advantage are numerous and diverse; as one example, in the upholstered furniture industry (where covering material is first shaped to the desired surface contour of the furniture, and then secured to the furniture frame by a multitude of tacks driven at closely spaced-apart intervals), there has been an urgent and long-standing need for a portable tack driving device that could be employed efficiently to eliminate the tedious and time-consuming practice of manual tack driving which has heretofore been necessary when employing tack fastenings. According to the present accepted practice employed in hand tacking, the operator must hold an adequate supply of sharp upholstery tacks within his mouth, thus leaving one hand free for stretching and holding the covering material in place while holding the tack hammer with the other hand. This practice has become known as "spit tacking" because the operator spits the tacks, one at a time, out of his mouth as they are required. The hazardous and unsanitary conditions attending such employment are reflected both by the high wages that must be paid to "spit tack" operators and by the increasing scarcity of such operators due to the increasing reluctance of young operators toward learning such an undesirable trade. The present alternative practice, now almost universally followed by women operators, is to place the supply of tacks in a shallow dish-like pan. This practice, however, greatly reduces the speed of production due to the time required for the operator's hand to reach into the pan, separate one tack from the rest and then convey it to the desired driving position.

Due to the above-mentioned reluctance toward "spit tacking" and to the inefficiency of the only alternative practice, some manufacturers have been compelled by economic considerations to sacrifice the quality features of tack-fastened products and to adopt the less acceptable practice of fastening materials in place by the use of two-legged staples. As is well known, these staples may be obtained preformed and assembled in magazine strip form, so that a quantity at a time may be placed in the magazine of a portable staple driving device. Also, there are obtainable some pneumatically actuated portable staple driving devices, employing preformed staples, which are capable of high operational speeds. Although the use of such equipment has increased the speed of production substantially over the speed heretofore obtainable by hand tacking, there are numerous serious disadvantages attending the use of staples. The most serious drawback to a staple fastening is its inadequate holding power as compared with that of a tack the head of which can be driven down securely to clamp a sufficient area of material to prevent the material being ripped readily or torn free from beneath the head of the fastening. In the case of staples the elongated bridge portion does not clamp the work firmly and, therefore, the material can be torn readily in much the same manner as though it had been fastened by piercing with two headless pins. Another disadvantage of preformed staples is that the legs are so weak and their driving points so blunt, as compared with a tack, that the staple frequently buckles when an attempt is made to drive its legs into a hard wood; whereas a tack may be driven effectively even into the area of a knot without causing the shank to buckle. In addition preformed staples cost about four times as much as the price of tacks.

The foregoing discussion regarding the relative merits and disadvantages of various methods of fastening is for the purpose of emphasizing the importance of the present invention to the many industries concerned with the above-described fastener inserting problems. By utilizing the device of this invention, these industries no longer need to sacrifice quality of production for speed of production, because applicant's tacking device not only operates with superior fasteners but inserts them more cheaply and faster than any means heretofore known or available.

Applicant is aware of several prior art patents, such as United States Letters Patent No. 1,703,458, granted February 26, 1929, to Ruff, and United States Letters Patent No. 1,980,967, granted November 13, 1934, to DeMooy, which disclose pneumatically actuated fastener inserting devices and which purport to disclose suitable constructions for the rapid feeding and driving of a succession of fasteners. However, after extensive practical research in the field of feeding, separating and driving tacks by pneumatic means, applicant has found that devices constructed in accordance with the teachings of prior patents could not be commercially acceptable because their constructions are neither designed to permit adequate speed of operation nor to prevent tacks becoming jammed in the mechanisms, thereby causing frequent delays for the purpose of disassembling the device to clear the jammed tack. Further very persuasive evidence of the impracticability of prior inventions is the fact that, although there has been a long standing and urgent need for a high speed portable hand tacker, no such device heretofore has been commercially available.

It is an object of the present invention to provide a novel and improved power driven device for inserting a series of fasteners at a very high rate of speed; said device in part comprising a portable light weight fastener driving gun assembly.

Another object is to provide a means for rapidly supplying the fasteners, one at a time, to the gun assembly even though the source or bulk supply of fasteners is remote from the gun.

A further object of the invention is the provision of solely pneumatically actuated means for operating the fastener driving gun assembly and for individually delivering the fasteners from their source of supply to the driving position in time relation to the operation of the gun assembly.

Still another object is to provide a portable gun assembly which is sufficiently compact and light weight so that an operator may comfortably hold and operate the assembly with one hand during prolonged intervals of continuous operation, and also may readily reposition the driving nose of the gun assembly at various desired locations along the work piece for accurately inserting a series of fasteners in rapid succession.

The invention embodied in the present device accomplishes all of the foregoing objects by inexpensive means which operate efficiently and at a high production rate with a minimum requirement of pneumatic pressure and a minimum volumetric consumption of air.

The scientific design and construction of the device of the present invention embodies many novel and advantageous features which have not as yet been mentioned. One of these features is the simplicity of the design which is aimed not only at reducing the cost of manufacturing the device, but also at minimizing the number of moving parts and thereby minimizing the necessity for replacing worn parts after extensive use.

Another advantageous feature of this construction is its economic use of air pressure. In this regard it is to be pointed out that the pressure required to operate the device successfully is relatively low (in the range of 50 to 80 lbs. per square inch); also the volume of air consumed is relatively small as compared with the consumption of other air driven fastener inserting devices which were tested in connection with the development of the present invention.

Another feature of this invention is that the gun, when in inoperative position, always contains a tack ready to be driven the instant the gun as activated. In addition the gun is work triggered, that is to say the activation of the gun is accomplished by merely pressing its nose thimble against the work. This latter feature, besides eliminating manual triggering, is a safety feature which assures that the gun is not prematurely actuated before the nose has been correctly positioned against the work.

Still another advantageous feature of the invention is the arrangement whereby the tack separating and delivery mechanisms are both automatically actuated in proper time relation to the operation of the gun, so that during the driving stroke of the gun a tack is separated from the remote supply and, during the return stroke of the gun, this tack is pneumatically delivered to the tack receptacle of the gun from whence it will be driven into the work upon the next driving stroke of the gun.

Another feature which greatly contributes to the successful operation of the device is the construction of the tack separating and delivery mechanism which includes a pneumatically reciprocated member to which the supply end of the tack delivery tube is secured and into which member a tack may be instantly separated from the raceway and placed in direct communication with the delivery tube each time the gun is pressed against a work piece. This member, which alternately shifts position in response to either the driving or the return stroke of the gun piston, also acts as an air valve to release a blast of air which blows transversely against the body of the separated tack to carry and hold the tack away from the lower end of the raceway and pneumatically to support it in delivery position immediately above the tube until the gun is lifted from the work piece. During the return stroke of the gun piston this valve member and the delivery tube shift away from the raceway to shut off the blast of air coming from the raceway, so that the separated tack is free to fall point first into the delivery tube. However, as soon as the valve member moves and shuts off the transverse blast, it releases a second blast directed upon the top of the tack so that the tack is pneumatically delivered to the gun.

A still further feature of the invention is the mechanism for rotating the tack pot thereby to keep the raceway supplied with tacks. This mechanism is actuated by the shifting movement of the above-mentioned pneumatically reciprocated valve member.

Another advantageous feature of the present device is the signaling mechanism by which the separating of a tack, and, later, the delivery of the separated tack to the gun are controlled in time relation to the operation of the gun; this signaling mechanism being constructed and arranged so that the separation of each tack is initiated during the driving stroke of the gun, but the actual delivery of a tack to the gun is not accomplished until the return stroke of the driving piston.

The above and other objects and features of this invention will appear from the following detailed description of the preferred embodiment thereof, illustrated in the accompanying drawings as a portable hand-held tack driving device, and will be pointed out in the claims. It is, however, to be clearly understood that the utility of the invention about to be described is in no way limited to apparatus of the type illustrated because it is within the contemplation and scope of this invention that similar or equivalent structures may be employed to insert nails, drive screws, or other driven fasteners.

In the accompanying drawings,

Fig. 1 is a longitudinal section of a fastener driving gun assembly, the parts thereof being illustrated in their inoperative position;

Fig. 2 is a similar section through portions of the gun, but viewed from a direction at right angles to the direction illustrated in Fig. 1;

Fig. 3 is a composite sectional illustration of parts of the gun as seen toward the completion of the fastener driving stroke; the upper portions of the gun being viewed from the same direction as illustrated in Fig. 1, while the lower portions are illustrated as viewed in accord with Fig. 2;

Fig. 4 is a top plan view of the gun nozzle viewed on the section line IV—IV of Fig. 3;

Fig. 5 is a side elevation partially broken away and in section showing details of Fig. 3 as viewed from another direction;

Fig. 6 is a schematic diagram illustrating various parts of the device in their inoperative position and in section in order better to demonstrate the pneumatic scheme for the automatic actuation of the device;

Fig. 7 is a left side elevation showing the construction of the assembly for supplying, separating and feeding the tacks to the gun;

Fig. 8 is a front elevation showing the construction of part of the fastener separating and feeding mechanisms as viewed in their inoperative position;

Fig. 9 is a left side elevation of parts shown in Fig. 8;

Fig. 10 is a right side elevation of parts shown in Fig. 8;

Fig. 11 is a section viewed along the line XI—XI of Fig. 10;

Fig. 12 is a left side elevation, partially in section, illustrating parts as viewed along the line XII—XII of Fig. 8;

Fig. 13 is an enlarged left side view of features of Fig. 7, with parts removed, and portions in section illustrating the portions in their operative position and viewed along the line XIII—XIII of Fig. 8;

Fig. 14 is an enlarged left side view showing features of Fig. 13 partially in section to illustrate the relationship of the parts when in inoperative position;

Fig. 20 is a perspective view showing further details of features illustrated in Fig. 8; and Fig. 21 is an elevation representing the pneumatic cylinder block of Fig. 20 as viewed from the rear, and showing some parts associated therewith in section.

Gun assembly

Figure 15:
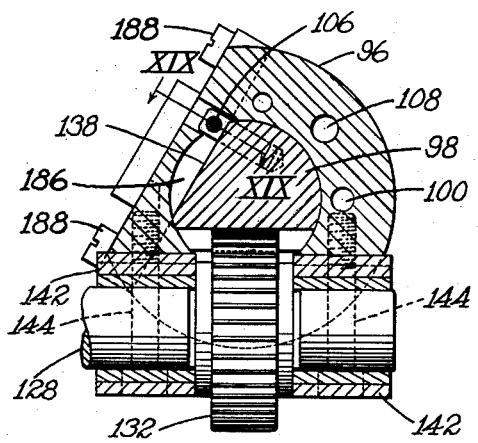
Fig. 15 is a sectional view of parts as seen along the line XV—XV of Fig. 8.

Referring to the drawings, and particularly to Figs. 1 and 2, it will be seen that the gun assembly comprises a hollow, outer casing member 20, of generally cylindrical shape on its exterior, but contoured sufficiently around its mid portion to fit comfortably within the palm and fingers of an operator's hand. This casing is preferably formed of light-weight metal, such as aluminum. In an internal bore 22, extending axially through the casing member, is positioned a sleeve 23, having a barrel 24, and an enlarged flange portion 26 extending outward at the lowest extremity of the sleeve, said portion fitting tightly against the annular bottom portion of the member 20. The sleeve 23 is secured in position within the casing 20 by means of a sleeve cap 28 threaded into the upper extremity of the barrel 24, and is provided with a gasket 30 forming a pressure seal between the cap screw 28 and the opening in the top of the casing member 20. The upper interior portion of the casing 20 is relieved to form an air accumulator chamber 32 which intercommunicates with the upper end of the barrel 24 through a series of ports 34 formed in the sleeve of the cap screw 28. The pneumatic pressure for operating the gun assembly is supplied by a flexible air hose 36 having one end secured by a suitable compression fitting 38 threaded into the upper portion of the cap screw 28. The lower extremity of the sleeve 23 is covered by a tack driver nozzle member 40 having a central elevated portion 42 fitting up into the lower end of the barrel 24 and substantially closing the lower end of the bore. The longitudinal sides of the nozzle 40 are tapered downward in step-like fashion. The nozzle 40 is concentrically retained in position, beneath the enlarged flange portion 26, by a set of screws 44 (Figs. 4 and 5) threaded upward into said flange portion. Throughout the axial center of the nozzle 40 extends an opening 46 which provides a guideway for a tack driver rod 48, the upper end of which rod is enlarged above its root portion 52 (Fig. 1). The stem of the driver rod extends upward through the nozzle opening 46 into the barrel 24 and the driver stem is secured at its upper extremity to a differential pneumatic piston 50 which is fitted to the upper and lower bore of the barrel 24. It will be noted, with reference to Fig. 1, that the root 52 of the driver rod is clamped into locking engagement with interior portions of the piston 50 by tightening a setscrew 54 threaded into a hollow core of the piston 50. It is also to be noted that the upper face of the pneumatic piston has a lesser diameter than the diameter of the lower piston face; also, that the lower and upper interior portions of the barrel 24 are each bored to a diameter to fit respectively the different diameters of said differential piston faces. The reason for thus providing a lesser area at the upper end of the piston will be explained hereinafter. The upward travel of this piston is limited by engagement with the lower lip of the cap screw 28 which extends into the path of the upper piston face. The lower extremity of piston movement is restricted by a resilient bumper ring 56 supported by the nozzle 40 and disposed within the lower or driving path of the piston. A set of tack supporting fingers 58, suitably formed of spring metal, is attached beneath the lower end of the nozzle opening 46 by a retaining sleeve assembly 60 threaded over the lower end of the nozzle member 40. The tacks, or other fasteners, are pneumatically supplied one at a time to the fingers 58 through a flexible delivery tube 62 running from the fastener feeding and separating assembly to a passage 64 leading obliquely downward into the lower portion of the nozzle opening 46. Surrounding the tapered portion of the nozzle member 40, and extending slightly beneath said member in nested relation therewith, is a hollow nose thimble 66, having a stepped interior contour complementing the adjacent longitudinal sides of the nozzle 40. The nose thimble is retained on the nozzle by a thimble pin 68, slidably positioned within a horizontal recess in the nozzle, and spring biased so as to extend outward through a slot 70 cut through the wall of the nose thimble. The above-described arrangement permits limited relative movement between the nozzle and nose thimble in the direction of their axes and also allows the nose thimble to be readily removed and reattached. The thimble 66 is normally held in extended position beyond the nozzle, as shown in Fig. 1, by the force of a set of compression springs 72 which, as will be explained hereinafter, also act as pneumatic valve ball seating members. These springs are each nested within an air passage 73 running downward, in the wall of the casing member 20, from the accumulator chamber 32. The lower end of each spring bears against the shoulder of a vertically movable ball spring pin 74 yieldably to urge the head of the pin downward upon a valve ball 76. On the opposite or lower side of each valve ball there is a valve ball trip pin 78, these pins being slidably positioned in vertical openings 79 through the nozzle member 40 (Fig. 4), so that the lower ends of the trip pins 78 are held in engagement with the upper rim of the nose thimble 66, thus tending to hold the nose thimble downward in extended relation to the nozzle 40. However, when an upward force is applied at the lower end of the nose thimble, as occurs when the gun is operatively pressed down upon a work piece (Fig. 3), the upper end of the nose thimble will engage the trip pins 78, thereby elevating these pins to lift the balls 76, against the force of the springs 72, off their valve seats 80 (Fig. 3) thereby permitting the venting of air from the lower bore of the barrel 24, as will be explained hereinafter, for the purpose of activating the driving stroke of the gun. As previously mentioned, the pneumatic pressure for actuating the tack driver piston 50 is always admitted to the space above the upper face of the piston directly from the air hose 36, and also from the air pressure accumulator 32 by the series of open ports 34. Whenever the nose thimble 66 is allowed to assume its normal inoperative position, as illustrated in Figs. 1 and 2, air under similar pressure is also admitted to the space in the lower end of the barrel 24. This air, which acts upon the larger diameter of the lower face of the piston 50 to elevate the piston and driver, flows from the accumulator 32 through the air passage 73, Fig. 2, and through openings 82 leading into the lower bore of the barrel 24. As long as the valve balls 76 are held seated by the springs 72 the pneumatic pressure is equalized at both ends of the piston 50, and, since there is a larger area at the lower face of the piston for the pressure to act upon, the piston will be held in its elevated position. However, when the nose thimble of the gun is pressed against a work piece W (Fig. 3) to drive a tack T from between the fingers 58, the valve trip pins 78 lift the valve balls 76 off their seats 80, allowing the pressure beneath the lower face of the piston to be vented to the atmosphere through a series of exhaust ports 84 leading through the nozzle member 40 adjacent the openings 79 (Figs. 4 and 5) and interconnected with the air openings 82. As the pneumatic pressure is exhausted from beneath the piston 50, the driving stroke quickly commences. As the piston moves downward (Fig. 3) it uncovers a valve opening 86 in the sleeve 23, allowing air under pressure to flow into a pneumatic signal tube 88 to actuate a plunger, at the other end of said tube, which constitutes a part of the tack feeding and separating assembly. The movement of this plunger controls the activation of said assembly in a manner which will be described in detail hereinafter. Prior to the time when the piston 50 uncovers the opening 86, there is only air under normal atmospheric pressure in the signal tube 88, because when the piston 50 is in its elevated position (Fig. 1) a laterally relieved central portion of the piston provides a passageway between the opening 86 and a series of exhaust ports 90, leading through the sleeve 23 and the outer casing member 20, so that the tube 88 is vented to the atmosphere at all times except during that interval of time when the driving piston is in the lower portion of the barrel 24. As soon as the tack has been driven and the operator lifts the gun from the work, the piston 50 returns upward and allows the tube 88 to be again vented. From the foregoing description of the construction and operation of the gun assembly it will be apparent that the pressure signal for another tack to be supplied to the gun is not conveyed by the pneumatic signal tube 88 until after the lower end of the driver rod 48 has entered between the set of tack fingers 58. It is, therefore, also apparent that, in each instance, the tack which is about to be driven from out the fingers 58 must have been separated from its source of supply and conveyed to said fingers as a result of the previous operating cycle of the gun. That is to say, the gun assembly is so coordinated in time relation with the operation of the tack separating and feeding assembly that each time the gun is actuated another tack is supplied to the gun ready to be driven by the next driving stroke of the gun.

*Tack separating and feeding assembly*

The gun assembly and the assembly for delivering tacks one at a time to the tack fingers of the gun are schematically illustrated in Fig. 6. At the extreme right of Fig. 6 is shown the plunger mechanism previously mentioned as being connected to the end of the pneumatic signal tube 88. During each driving stroke of the gun piston 50, the signal tube plunger 92 is pneumatically elevated to shift an exhaust valve 94 from closed to open position. The valve 94 controls the actuation of the tack separating and feeding mechanism which is schematically illustrated as comprising in part a pneumatic cylinder block 96 having within its bore a reciprocable member 98 which, as will be seen later, serves both as a pneumatic piston, to separate a tack from the raceway and to drive a tack pot, and as a valve to control the release of a series of air blasts directed toward the separated tack first to blow the tack from the raceway and later to deliver the tack to the gun. The right-hand end of the reciprocable member 98 and the cylinder bore adjacent the exhaust valve 94 are both of larger diameter than the other or left-hand ends of the member 98 and cylinder bore. When the valve 94 is closed, air under pressure, entering the left end of the bore from the air hose 36, flows through an air passage 100 to the right end of the cylinder bore and equalizes the air pressure at both ends of the member 98, causing the member to be held toward the left until the exhaust valve 94, which is biased, by a spring 95, toward closed position, is opened by the upward movement of the plunger 92 in response to the signal for another tack to be delivered to the gun through the tack delivery tube 62. The tube 62, leading downward to the gun, has its upper end secured to the member 98 and in direct open communication with a tack receptacle or notch 102, formed transversely in said member, into which receptacle a tack may be received from the discharge end of a raceway 104 whenever the member 98 is moved to the right, whereupon the receptacle 102 and the adjoining delivery tube 62 are both alined with said end of the raceway 104. It is to be understood that the discharge end of the raceway is constantly kept supplied with a row of tacks by a hopper and tack pot mechanism (not shown in Fig. 6) which will be later described. As the member 98 is moved toward the right (as viewed in Fig. 6) a separator pin 106, biased in the same direction by a loaded spring 105, enters between the two endmost tacks in the raceway thus to separate a single tack for delivery to the receptacle 102. As will be observed from Fig. 19, the separator pin 106 is normally held in retracted relation with respect to the raceway by a stud 107 projecting from the member 98, the pin being freely journaled through the stud 107 and being provided with a shoulder abutting the spring on one side and the stud on the other side. Just before the tack receptacle arrives at its tack receiving position beneath the end of the raceway, the displacement of the reciprocable member 98 toward the right acts as a valve to uncover an air passageway 108 through which a blast of air is directed to blow the separated tack from the raceway and into the tack receptacle 102 in a manner which later will be described in more detail. The member 98 remains in its right-hand position until the return stroke of the gun piston 50 vents the signal tube 88, thus permitting the exhaust valve 94 to be closed by the spring 95. Upon the closing of the valve 94, the resulting build-up of pneumatic pressure against the right-hand end of the member 98 causes the member to return toward the left. As this movement commences, the left end of the member 98, acting again as a valve, closes the air passageway 108, thus shutting off the air blast coming from the end of the raceway. However, as the tack receptacle 102 is moved away from the raceway it alines itself with another air pressure line 110 which directs a strong blast of air down into the receptacle and directly upon the head of the tack which is then within the receptacle thereby to blow the tack point first into the tube 62 and down to the gun.

The construction and the operational features of the tack separating and feeding assembly just briefly described will be perceived more fully from the following detailed description. Referring to Fig. 7, the illustrated construction embodies a stationary bracket frame 112 supported by a fixed column 114. A tack supply hopper 116, formed in the upper portion of the frame 112, serves as a throat through which tacks, in bulk form, may be dumped into a tack pot 118 which is of conventional design and is rotatably mounted upon a spindle 120 affixed to the frame 112. The tack pot is provided with a peripheral ring gear 122 driven by a smaller gear 124 on one end of a driven shaft 126 journaled in the frame 112. The shaft 126 is coupled at its other end to a rocker shaft 128 by a clutch 130, of the ratchet wheel and pawl type, which permits only unidirectional movement to be imparted to the gear 124. The shaft 128 is oscillated in alternate directions by a drive gear 132 in mesh with a gear rack 134 (Fig. 8) formed longitudinally on the bottom of the reciprocable member 98, so that each time the member 98 is reciprocated, to separate and deliver a tack, a rotary driving impulse is conveyed to the tack pot causing it to lift a quantity of tacks and deposit them upon the upper end of the raceway 104. The lower end of the raceway and of the raceway cover 136 are both fitted into a transverse slot 137 (Fig. 13) cut through the side wall of the pneumatic cylinder block 96, so that the discharge end of the raceway opens into the larger bore of the block 96 and normally abuts against a flatted side portion 138 of the reciprocable member 98. The pneumatic cylinder block 96 is rigidly attached, by screws 140, to two forward bracket portions, 139 and 141, of the frame 112 (Figs. 7 and 13). The rocker shaft 128 and the drive gear 132 are rotatably supported within a pair of trunnion blocks 142 (Figs. 8 and 15) secured by screws 144 to the bottom of the cylinder block 96, the lower wall of which block is ported in the vicinity of the gear 132 so that the gear may engage with the rack 134 on the member 98. The raceway 104 and cover 136 are each secured at their lower end to the bracket portion 141 by screws 143, 145.

Referring to Figs. 8 through 11, it will be observed that the cylinder block 96 is provided, at its compressed air inlet end, with a cylinder cap 146 and a cylinder gasket 147, both secured to the block by a series of screws 148. A main air supply passage 150 is formed in the cap with a threaded inlet end to receive a coupling on a compressed air supply hose. The passage 150 communicates with an opening 151 leading through the gasket to conduct air into the block 96. Another passage 152, similarly threaded to receive an air hose, communicates with the main passage 150 to supply compressed air to the gun assembly. The exhaust end of the cylinder block 96 is capped by an exhaust valve block 154 and gasket 155 both secured to the cylinder by screws 156. The exhaust valve 94, for venting the compressed air from the bore at this end of the block 96, consists of a rotatable valve stem 158 provided with a series of diametrically disposed openings 159 which, by turning the stem, are shifted into or out of alinement with another series of openings 160 passing through the valve block 154 and leading from the adjacent cylinder bore to vent the pressure therefrom when both series of openings are axially alined with each other. The rapidity with which the exhaust end of the bore is vented can be regulated to some extent by a needle valve screw 162 which is adjustable to reduce or increase the flow of air through one of the openings 160. The valve stem 158 is biased, by the spring 95, in a counterclockwise direction (as viewed in Fig. 8) to close the exhaust. As previously mentioned, the exhaust valve 94 is opened by a tack signal mechanism including a tack signal tube plunger 92 which is pneumatically operated in response to the driving stroke of the gun piston 50. The plunger 92 is operatively mounted in a cylinder bracket 164 bolted to the valve block 154, and the signal tube 88 is connected to a coupling sleeve 165 projecting from the cylinder bracket. When the plunger 92 is lifted, by pneumatic pressure within the tube, it engages an arm 166 extending radially from the valve stem 158, and shifts the arm and stem in a clockwise direction to open the exhaust valve 94.

Figure 16:
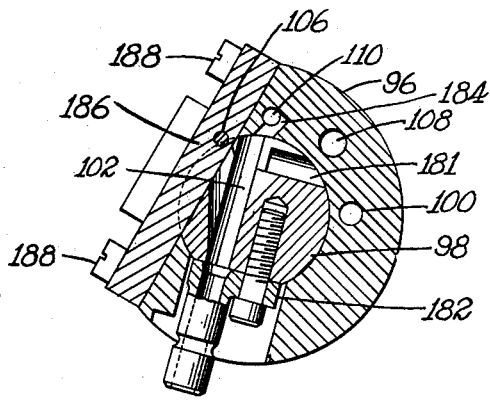
Fig. 16 is a sectional view of parts as seen along the line XVI—XVI of Fig. 8.
Figure 17:
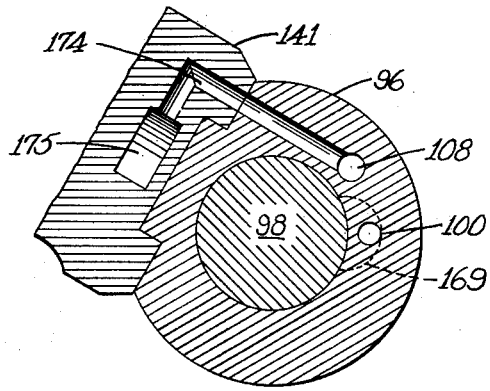
Fig. 17 is a sectional view of parts as seen along the line XVII—XVII of Fig. 8.
Figure 19:
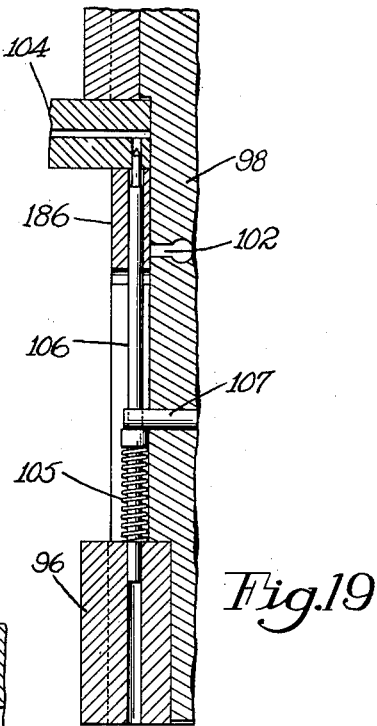
Fig. 19 is a sectional view of the separator detent pin mechanism as seen along the line XIX—XIX of Fig. 15.
Figure 18:
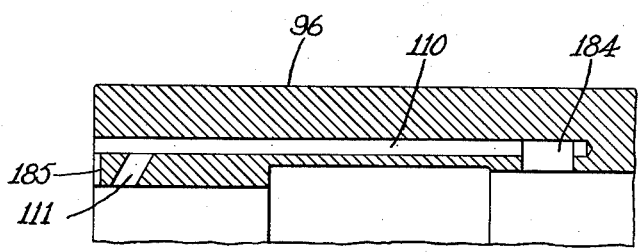
Fig. 18 is a sectional view of a detail as seen along the line XVIII—XVIII of Fig. 12.

The pneumatic cylinder block 96 and parts directly associated therewith are provided with three principal pneumatic conduit systems, each respectively supplying compressed air from the air inlet end of the block; one for conducting air to the exhaust end of the bore, another for supplying the air blast to blow the end tack from the raceway, and a third to blow the tack through the delivery tube. The construction and arrangement of these systems will be described with particular reference to Figs. 8 and 20. Compressed air from the air supply opening 151 enters a chamber 168 and flows directly into the adjacent small end of the cylinder bore; it also flows through the air passage 100 into another chamber 169 opening directly into the large exhaust end of the bore. As previously described, the air pressure at the ends of the cylinder bore actuates the reciprocable member 98 in response to the opening and closing of the exhaust valve 94. The system for supplying air to the discharge end of the raceway is opened, when the member 98 has moved to position the receptacle 102 in communication with the raceway, by sufficient displacement of the member 98 to uncover an opening 99 thereby to admit air from the bore into the passageway 108 terminating in openings 170 and 171 adjacent the raceway. Air flows from the opening 170 into a pneumatic passage 172, in the cover 136 (Figs. 13 and 14), having a vent end communicating with the cylinder bore and arranged to blow a portion of the air supplied by the passageway 108 angularly upon the head of the endmost tack in a direction away from the raceway. The remainder of the air from the passageway 108 flows from the opening 171 through an elbow air line 174 formed in the bracket 141 (Fig. 17) and through an enlarged opening 175 in the bracket adjacent the outer side of the raceway 104, thence into a series of blast tubes 176 (Figs. 13 and 14) leading from the opening 175 to the inner end of the raceway and terminating in a series of vents 177 arranged to direct air against the body of the endmost tack in the raceway, so that when the receptacle 102 is in line with the raceway said tack will be blown from the raceway. The air emitted from the vents 173 and 177 does not escape through the delivery tube 62 because, for the time being the inlet from the tack passage 64 (Fig. 1) is obstructed by the driver 48 which then is in its lowermost position. Furthermore, according to an important feature of the invention, it is not desirable to have the separated tack delivered to the gun until the tack driver has returned upward. Therefore, an exhaust port 180 is provided through the side wall of the block 96 communicating with a passage 181 cut transversely through the member 98, for venting the air from the receptacle 102, whenever the member 98 is in tack receiving position (Fig. 13). The effect of the air flow from the vents 173 and 177 toward the port 180 is pneumatically to support the tack against the force of gravity and to sustain or float it within said air flow until the desired time for delivering the tack is occasioned by the return upward of the driver which signals for the delivery of the tack by closing the exhaust valve 94 thereby to initiate the operation of the third pneumatic conduit system. When the receptacle 102 is moved away from the raceway the passage 181 no longer is in communication with the exhaust port 180 (Fig. 16) and any compressed air entering the receptacle 102 must then pass outward through the tack delivery tube 62 which is held in communication with the receptacle 102 and is secured to the member 98 by a bracket 182 bolted beneath the member 98. Referring once more to Figs. 8 and 20, the block 96 is provided with an air passage 110 leading from the air intake end of the bore to an elongated air pocket 184 opening into an intermediate portion of the bore. As the reciprocal member 98 moves the receptacle away from the raceway, the receptacle is brought into alinement with the pocket 184 (Fig. 16) so that a strong blast of air is directed into the receptacle and through the delivery tube 62 to blow the tack into driving position within the gun. This blast of air continues until continued movement of the member 98 causes the member to cover the opening 111 which supplies the main body of air to the passage 110. However, by this time the tack has had sufficient time to reach the gun. Even after the opening 111 has been closed, a small passage 185 (Fig. 18) continues to bleed air into the system to blow air through the tube 62, so that while the receptacle and gun remain in their inoperative positions, this small supply of air holds the delivered tack in proper position within the tack fingers 58 even though the gun should be inverted before the tack is driven. A detail, heretofore not mentioned but best illustrated in Fig. 21, is a rectangular flat plate 186 fastened by screws 188 to the rear wall of the cylinder block 96, so that the front part of the plate forms a flush engagement with the flatted side 138 of the reciprocable member 98. The feature of providing a recessed portion in the block 96 to accommodate the plate 186 adjacent the raceway slot 137, and of having this plate removable is for the purpose of enabling the separator pin 106, the spring 105 and the stud 107 to be assembled or serviced. The plate 186, when fastened in place, serves as a portion of the rear wall of the cylinder block 96. In the absence of the plate 186, the air admitted, from the air pocket 184, into the receptacle 102 would escape directly to the atmosphere without having to pass through the delivery tube 62. However, as best shown in Figs. 16 and 19, when the receptacle 102 is moved away from the end of the raceway and while in communication with the air blast from the pocket 184, the rear longitudinal opening through which the fasteners enter from the raceway is closely sealed by the engagement of the flatted side 138 with the inner wall of the plate 186, so that the air blast must flow through the delivery tube. Another feature, which is illustrated in Fig. 6, is the provision of a balance spring 190 attached to the gun casing to support the weight of the gun. This spring is preferably of sufficient length and resiliency to permit the operator to move the gun readily in both vertical and horizontal directions by tensioning and stretching the spring support.

*Automatic sequence of operation*

The operation of the device of the present invention, commencing with the "at rest" or inoperative phase, is as follows: Assuming that the device has previously been in operation, there will be a tack positioned within the fingers 58 of the gun, and the raceway will have a row of tacks supported at the discharge end by the flatted side 138 of the member 98 which when in inoperative position blocks the end of the raceway. The operator presses the nose thimble 66 against the work piece, in the vicinity at which the tack is to be driven, thus unseating the valve balls 76 to exhaust the air from beneath the driver piston 50, whereupon the driving stroke of the gun is initiated. The compressed air, acting only against the upper face of the piston, actuates the driving stroke to drive the tack and to uncover the opening 86 admitting air under pressure into the signal tube to initiate the separation of another tack. The signal tube plunger 92 lifts, causing the exhaust valve 94 to open and vent compressed air from the adjacent end of the reciprocable member 98, thus initiating the tack separating operation. The compressed air, now acting only against the other or smaller end of the member 98, activates the separator mechanism to shift the member 98 quickly toward the right, as viewed in Fig. 8. This movement rotates the gear 132, to operate the tack pot, and allows the spring 105 to slide the separator pin 106 between the two endmost tacks. Just before the receptacle 102 is moved into alinement with the raceway, the opening 99 is uncovered by the movement of the member 98, thus admitting air under pressure into the passage 108 to initiate a blast of air from the vents 173 and 177. This air, in its passage through the receptacle 102 and out the exhaust port 180, holds the separated tack within the receptacle as long as the exhaust valve 94 is held open by reason of the gun remaining pressed against the work piece. When the fastener has been driven, the operator lifts the gun from engagement with the work piece, allowing the springs 72 in the gun to seat the valve balls 76. Compressed air, then confined within the lower end of the sleeve 23, acts upon the lower or larger face of the piston 50 to return the piston upward to its inoperative position. The upward movement of the piston cuts off the feed of air pressure to the signal tube 88 and allows the pressure already in the tube 88 to be vented to the atmosphere through the ports 90, thus initiating the tack delivery operation. With the pressure vented from the signal tube, the spring 95 closes the valve 94 thereby confining compressed air within the larger end of the bore in the cylinder block 96. The resulting equalization of air pressure at both ends of the member 98 causes the member to return toward its inoperative position. As the receptacle 102 moves out of communication with the air blasts admitted from the end of the raceway, it is brought into communication with the air pocket 184 which delivers a stream of air directly on top of the head of the tack rapidly to transport the tack to the fingers 58. The return movement of the member 98 closes the air opening 99 and also retracts the separator pin 106, thus restoring all parts to their inoperative positions. It is to be understood that in the normal use of the gun, when a series of tacks are to be driven at rapid speed, momentum will keep the tack pot rotating during the short interval between successive separating strokes of the member 98. Thus, when once commenced to rotate, the tack pot will require little force to keep it rotating at the desired speed, and hence the driving of the gear 132 will not materially impede the speed of movement of the member 98 after the first couple of operating cycles have been accomplished.

Having described the invention, what is claimed as new and desired to be secured by Letters Patent of the United States is:

1. A pneumatically actuated fastener feeding and driving device comprising: a driver movable between inoperative and operative positions; means for controlling the driver movements; a source of fastener supply remote from the driver; a pneumatic conduit having one end leading into the operative path of the driver for delivering a fastener thereto, and having another end supported adjacent the fastener source; means, including a pneumatic pressure vent directed toward said other end of the conduit and operative in response to movement of the driver toward one position, for releasing a fastener from said source and blowing said fastener into open communication with said conduit; and means, responsive to movement of the driver toward the other position, for pneumatically delivering the fastener through said conduit.

2. A pneumatically actuated fastener feeding and driving device comprising: a driver movable between inoperative and operative positions; means for controlling the driver movements; a source of fastener supply remote from the driver; a pneumatic conduit having one end leading into the operative path of the driver for delivering a fastener thereto, and having another end operatively supported adjacent said source to receive a fastener therefrom; means for directing a blast of air from said source and toward the other end of the conduit, said last means being operative, in response to movement of the driver toward one position, to blow a fastener into said other end and pneumatically to sustain the fastener therein until the driver is moved toward the other position; and pneumatic means, operable in response to movement of the driver toward said other position, for blowing the fastener through the conduit.

3. A fastener feeding and driving device comprising: a fastener driving assembly including a power operated driver and means for controlling the movements of the driver between inoperative and operative positions; a fastener supply raceway remote from said assembly; a pneumatic delivery conduit, having its delivery end leading to said assembly, and having its fastener receiving end supported adjacent the discharge end of the raceway; an escapement device operative to release the endmost fastener from said end of the raceway for delivery to the receiving end of the conduit; pneumatic means operative to direct an air blast transversely against the body of a released fastener and to sustain said fastener within the receiving end of the conduit; and control means, responsive to said movements of the driver, for rendering both the escapement device and the pneumatic means operative upon movement of the driver toward its operative position and inoperative upon movement of the driver toward its inoperative position.

4. A fastener feeding and driving device comprising: a fastener driving assembly including a power operated driver and means for controlling the movements of the driver between inoperative and operative positions; a fastener supply raceway remote from said assembly; a pneumatic delivery conduit, having one end leading to the assembly for transporting fasteners thereto, and having its other end shiftably mounted adjacent the discharge end of the raceway; means, responsive to the movements of the driver, for shifting said other end to and fro adjacent said end of the raceway thereby to move the delivery conduit into and out of fastener receiving communication with the raceway in time relation to the movements of the driver; pneumatic pressure means, associated with the end of the raceway and operative upon movement of the conduit into communication with the raceway, for blowing the endmost fastener away from the raceway and pneumatically sustaining said fastener within the receiving end of the conduit until said conduit is shifted out of communication with the raceway; and additional pneumatic pressure means, activated by the movement of the conduit out of communication with the raceway, for blowing the fastener through said conduit.

5. A fastener feeding and driving device comprising: a fastener driving gun assembly including a power operated driver and means for controlling the movements of the driver between inoperative and operative positions; a pneumatic delivery tube having one end leading to said gun for transporting fasteners thereto; a fastener supply raceway; a movable member to which the other end of the delivery tube is secured, said member having a fastener holding receptacle in open communication with said tube; means, responsive to the movements of the driver, for shifting the member to and fro adjacent the discharge end of said raceway thereby to move the receptacle into and out of fastener receiving communication with the raceway in time relation to the movements of the driver; pneumatic pressure means, associated with said end of the raceway and activated by movement of the receptacle into communication with the raceway, for blowing a fastener away from the raceway and pneumatically supporting said fastener within the receptacle until the receptacle is moved out of communication with the raceway; and additional pneumatic pressure means, activated by the movement of the receptacle out of communication with the raceway, for blowing the fastener into and through said tube.

6. A fastener feeding and driving device comprising: a portable gun assembly including a power operated driver and manually operable means for controlling the movements of the driver between inoperative and operative positions; a pneumatic delivery tube having one end leading to the gun assembly for transporting fasteners thereto in time relation to said movements of the driver; a fastener supply raceway; a slide member to which the other end of the delivery tube is secured, said member having a fastener holding receptacle in open communication with said tube; means, responsive to the movements of the driver, for shifting the slide member to and fro adjacent the discharge end of said raceway thereby to move the receptacle into and out of fastener receiving communication with the raceway in time relation to the movements of the driver; pneumatic pressure means, associated with said end of the raceway and activated by movement of the receptacle into communication with the raceway, for blowing a fastener away from the raceway and pneumatically supporting said fastener within the receptacle until the receptacle is moved out of communication with the raceway; and additional pneumatic pressure means, activated by the movement of the receptacle out of communication with the raceway, for blowing the fastener into and through said tube.

7. A fastener feeding and driving device comprising: a gun assembly including a power operated driver and means for controlling the movements of the driver between inoperative and operative positions; a delivery tube having one end leading to the gun assembly for transporting fasteners thereto; a fastener supplying raceway; a separator associated with the discharge end of said raceway for releasing one fastener at a time to be transported to the gun assembly; a member movably supported adjacent said raceway end, said member having a fastener holding receptacle carried by the member into and out of position to receive a separated fastener from the raceway; means for securing the other end of the delivery tube to said member in alined communication with the receptacle to receive said fastener therefrom; means, responsive to movement of the driver toward one position, for actuating the separator and for moving said member and receptacle into position to receive the separated fastener; pneumatic pressure means, activated by said movement of the member into said receiving position, acting directly against the body of the separated fastener to blow the fastener away from the raceway and to support it within the receptacle; means, responsive to movement of the driver toward its other position, for moving the member and receptacle out of fastener receiving position thereby to terminate the action of said pressure means and allow the fastener to be delivered into the tube; and additional pneumatic pressure means acting directly against the head of the fastener to blow the fastener out of the receptacle and through the tube, said last-mentioned means being activated in response to the movement of the member and receptacle out of fastener receiving position.

8. A fastener feeding and driving device comprising: a portable gun assembly including a power operated driver and manually operable means for controlling the movements of the driver between inoperative and operative positions; a pneumatic delivery tube having one end leading to the gun assembly for transporting fasteners thereto in time relation to said movements of the driver; a fastener supplying raceway; a separator associated with the discharge end of said raceway for releasing one fastener at a time to be transported to the gun assembly; a reciprocable slide member movable adjacent said raceway end in directions crosswise thereto, said member being provided with a fastener receiving notch formed and arranged therein so as to be carried by the member into and out of position to receive a separated fastener from the raceway; means for securing the other end of the delivery tube to said member in alined communication with said notch to receive the fastener therefrom; means, responsive to movement of the driver toward its operative position, for actuating the separator and for moving the slide member and notch into position to receive the separated fastener; pneumatic pressure means, activated by said movement of the member into said receiving position, acting directly against the body of the separated fastener to blow the fastener away from the raceway and to support it within the notch; means, responsive to movement of the driver toward inoperative position, for moving the slide member and notch out of fastener receiving position thereby to terminate the action of said pressure means and allow the fastener to be delivered into the tube; and additional pneumatic pressure means acting directly against the head of the fastener to blow the fastener out of the notch and through the tube, said last-mentioned means being activated in response to the movement of the slide member and notch out of fastener receiving position.

9. In combination with a portable fastener driving gun assembly provided with a reciprocable power operated driver mechanism and manually activated means for controlling the movements of said mechanism between inoperative and fastener driving positions; a fastener feeding mechanism comprising a fixed fastener supplying raceway; a separator for releasing one fastener at a time from the end of said raceway; a pneumatic delivery tube leading to the gun assembly for transporting a released fastener to the gun; means, operative in response to the movement of the driver mechanism toward driving position, for moving the delivery tube into open communication with the end of the raceway, pneumatic pressure means associated with the end of the raceway for blowing said fastener from the raceway and into delivery position in axial alinement with said tube, said means being arranged to prevent the fastener from entering said tube while the driver mechanism is in driving position; and means, responsive to the movement of said driver mechanism toward inoperative position, for blowing said fastener into said tube and transporting it to said gun assembly.

10. A fastener feeding and driving device comprising: a portable gun assembly including a power operated driver and manually operable means for controlling the movements of the driver between inoperative and operative positions; a fastener supplying raceway; a reciprocable slide block mounted for movement in directions transverse to the bottom of the raceway, and having a fastener receiving notch formed and arranged therein so as to be movable into alinement with said raceway to receive a fastener therefrom; a pneumatic delivery tube leading to said gun assembly and having a fastener receiving end affixed to the slide block and in open axial alinement with said notch; pneumatic valve means responsive to the movement of the driver toward operative position for first moving said block to position the notch and tube end in alinement with the raceway, and responsive to the movement of the driver toward inoperative position for then moving the notch and tube out of alinement with the raceway; means responsive to said first movement of the block for separating one fastener from the raceway and for directing a blast of air transversely against the body of the separated fastener to blow it away from the raceway and support it within the notch; and means responsive to the movement of the block in the opposite direction for terminating said blast of air and for releasing an air pressure stream directly upon the head of the fastener to blow the fastener into and through the delivery tube.

11. The combination, with a power operated fastener driver having means for controlling its movements between operative and inoperative positions, of mechanism operatively associated with the driver for supplying fasteners thereto one at a time in response to the movements of the driver, said mechanism comprising: a pneumatic tube having one end leading to the driver for delivering fasteners thereto; a fastener supplying raceway; a fastener receptacle movable into and out of fastener receiving position adjacent the discharge end of the raceway; securing means for maintaining the other end of the tube in open communication with the receptacle; a first pneumatic pressure means having a vent associated with said end of the raceway and operative to direct a blast of air transversely against the body of the endmost fastener in the raceway to blow it away from the raceway and pneumatically support the fastener within the receptacle while the receptacle is in said receiving position; a second pneumatic pressure means having a vent arranged to communicate with the receptacle upon movement of the receptacle out of fastener receiving position and to direct a blast of air upon the head of the fastener to blow it into and through said tube; means, responsive to movement of the driver in one direction, for moving the receptacle into fastener receiving position whereby the fastener is pneumatically blown into said receptacle; and means, responsive to movement of the driver in the other direction, for moving the receptacle out of receiving position and into communication with said second pressure means whereby the fastener is delivered to the driver.

12. The combination, with a power operated fastener driver having means for controlling its movements between operative and inoperative positions, of mechanism operatively associated with the driver for supplying fasteners thereto one at a time in response to the movements of the driver, said mechanism comprising: a pneumatic tube having one end leading to the driver for delivering fasteners thereto; a fastener supplying raceway; an escapement device operative to release one fastener at the discharge end of the raceway; a fastener receptacle movable into and out of fastener receiving position adjacent the discharge end of the raceway; securing means for maintaining the other end of the tube in open communication with the receptacle; a first pneumatic pressure means having a vent associated with said end of the raceway and operative to direct a blast of air transversely against the body of said one released fastener to blow it away from the raceway and pneumatically support the fastener within the receptacle while the receptacle is in said receiving position; a second pneumatic pressure means having a vent arranged to communicate with the receptacle upon movement of the receptacle out of fastener receiving position and to direct a blast of air upon the head of the fastener to blow it into and through said tube; means, responsive to movement of the driver in one direction, for activating the escapement device and for moving the receptacle into fastener receiving position; means, including said last mentioned means, for controlling the operation of said first pressure means; and means, responsive to movement of the driver in the other direction, for moving the receptacle out of receiving position and into communication with said second pressure means.

13. The combination, with a power operated fastener driver having means for controlling its movement between operative and inoperative positions, of mechanism operatively associated with the driver for supplying fasteners thereto one at a time in response to the movements of the driver, said mechanism comprising: a pneumatic tube having one end leading to the driver for delivering fasteners thereto; a fastener supplying raceway; a fastener receptacle movable into and out of fastener receiving position adjacent the discharge end of the raceway; securing means for maintaining the other end of the tube in open communication with the receptacle; pneumatic pressure means associated with said end of the raceway and operative to direct a blast of air transversely against the body of the endmost fastener in the raceway to blow it out of the raceway and into a position within said receptacle in open alinement with said tube; and means, responsive to the movement of the driver, for moving the receptacle and tube into fastener receiving position.

14. In a fastener feeding and driving device, the combination of means for supplying fasteners to a raceway; a separator mechanism operatively associated with the lower end of said raceway for releasing fasteners, one at a time from said raceway, into a pneumatic transfer conduit, said conduit having one end carried by said mechanism and the other end leading to the fastener inserting location; a source of pneumatic pressure arranged to direct a blast of air from the raceway and through a portion of the separator mechanism in the direction of said conduit; means for actuating said mechanism to separate a fastener; and means, responsive to the actuation of the mechanism, for releasing a blast of air from said source each time a fastener is separated to hold the fastener in separated position.

15. A fastener separating and delivery mechanism comprising: a relatively fixed cylinder sleeve having a bore larger at one end than the other; a fastener feeding raceway transverse to the axis of said sleeve and having its discharge end in communication with the larger bore of said sleeve; means for simultaneously delivering air under uniform pressure to both ends of the bore; exhaust means associated with the larger end of the bore for periodically venting the air from the end of the bore nearest the raceway; a reciprocably movable member slidably positioned within the bore of said cylinder sleeve and having oppositely disposed end piston faces fitted to said bore, the larger face being disposed nearest to the exhaust end of the bore and acting to shift the member toward the other end of the bore into inoperative position when the exhaust is closed; a fastener delivery tube having an open receiving end extending into the bore of said sleeve and attached to said member to be movable therewith into and out of communication with said end of the raceway; means, operative in response to the movement of the member toward the raceway, for releasing one fastener from the end of the raceway each time said tube is shifted into communication with the raceway; means, responsive to the operation of a fastener driving mechanism, for opening said exhaust to move said member and thereby shift the tube into communication with the raceway; valve means controlled by the movement of the member and operative to release a stream of fluid pressure directed transversely against the body of the released fastener to blow it away from the end of the raceway and to pneumatically support it within the bore of the sleeve; and additional valve means operative to release a stream of fluid pressure directed against the head of said fastener to blow the fastener into and through said tube to said fastener driving mechanism.

16. A fastener feeding and driving device comprising: a power operated driving tool movable between inoperative and driving positions; a fastener delivery conduit having a delivery end leading to the tool and a fastener receiving end movably associated with a fastener supply raceway; means, including a slide, for movably supporting said receiving end of the conduit adjacent the discharge end of the raceway; and means, responsive to the fastener driving movement of the tool, for shifting the receiving end of the conduit into fastener receiving position with respect to said end of the raceway and for pneumatically blowing a fastener from the end of the raceway into said conduit; and means, responsive to movement of the tool toward inoperative position, for shifting the conduit out of fastener receiving position and for pneumatically delivering the fastener through the conduit.

17. In fastener separating and feeding device, a raceway; means for keeping the fastener discharge end of the raceway supplied with a row of fasteners; a detent associated with said end of the raceway operative to release the endmost fastener in the raceway; a fastener delivery conduit having a receptacle portion disposed adjacent said end of the raceway for receiving a fastener when released therefrom; a first pneumatic means, including a source of compressed air, a valve and an air vent for directing a blast of air substantially sidewise against the body of a released fastener, said vent being arranged to pneumatically support the fastener within the receptacle portion; a second pneumatic means, including a valve and an air vent arranged to release a blast of compressed air against the head of the fastener and directed through said conduit; means for actuating said detent; and control means for alternately operating said valves in sequence with the operation of the detent, whereby each released fastener is first positioned in the receptacle portion of the conduit by the first pneumatic means and is later delivered through the conduit by the second pneumatic means.

18. Apparatus for feeding and driving fasteners comprising: a fastener driver; a fastener supply raceway; a separator for separating fasteners, one at a time from said raceway, for delivering to said driver; means for operating the driver and the separator; and pneumatic means, effective during the operative stroke of the driver for pneumatically holding each fastener as it is separated suspended between said separator and driver, and effective after the operative stroke of the driver for pneumatically transferring said fastener into position to be driven.

19. A fastener handling and inserting device comprising: a power operated fastener inserting gun; a raceway; means for delivering fasteners to said raceway; means, associated with the discharge end of said raceway, for restraining all but the endmost fastener in said raceway; a delivery tube extending from a point adjacent the discharge end of the raceway to the inserting gun; means for separating said endmost fastener from said raceway, including pneumatic means directed against the endmost fastener; and means responsive to the operation of said gun for cyclically controlling the opertaion of said restraining means.

References Cited in the file of this patent

UNITED STATES PATENTS

| | | |
|---|---|---|
| 1,426,389 | Jerram et al. | Aug. 22, 1922 |
| 1,703,458 | Ruff | Feb. 26, 1929 |
| 1,980,967 | De Mooy | Nov. 13, 1934 |
| 2,534,140 | Moore | Dec. 12, 1950 |
| 2,540,604 | Van Sittert et al. | Feb. 6, 1951 |